(12) United States Patent
Risley

(10) Patent No.: US 10,315,717 B2
(45) Date of Patent: Jun. 11, 2019

(54) RETRACTABLE BIPOD MOTORCYCLE STAND

(71) Applicant: Matt Risley, Phoenix, AZ (US)

(72) Inventor: Matt Risley, Phoenix, AZ (US)

( * ) Notice: Subject to any disclaimer, the term of this patent is extended or adjusted under 35 U.S.C. 154(b) by 127 days.

(21) Appl. No.: 15/731,945

(22) Filed: Aug. 28, 2017

(65) Prior Publication Data
US 2019/0061848 A1    Feb. 28, 2019

(51) Int. Cl.
*B62H 1/02* (2006.01)

(52) U.S. Cl.
CPC ........................... *B62H 1/02* (2013.01)

(58) Field of Classification Search
CPC ..................... B62H 1/02; B62H 1/00
See application file for complete search history.

(56) References Cited

U.S. PATENT DOCUMENTS

| | | | | |
|---|---|---|---|---|
| 4,671,374 A * | 6/1987 | Kouyama | ................. | B62H 1/02 180/219 |
| 4,693,488 A * | 9/1987 | Bernocco | ............... | B62H 5/005 280/293 |
| 4,976,452 A * | 12/1990 | Fujita | ....................... | B62H 1/02 280/293 |
| 5,100,164 A * | 3/1992 | Miyamaru | ................ | B62H 1/00 180/219 |
| 5,819,868 A * | 10/1998 | Koike | ....................... | B60L 3/00 180/220 |
| 5,886,349 A * | 3/1999 | Su | ............................ | B62H 1/00 180/219 |
| 6,536,792 B2 * | 3/2003 | Strasser | .................... | B62H 1/02 280/293 |
| 6,679,990 B2 | 1/2004 | Doveri | | |
| 6,733,025 B2 * | 5/2004 | Su | ............................ | B62H 1/02 180/219 |
| 6,845,999 B2 | 1/2005 | Royal, Sr. | | |
| 7,028,850 B1 | 4/2006 | Sargisian | | |
| 7,140,631 B2 | 11/2006 | Ridley | | |
| 7,584,979 B2 | 9/2009 | Labonte | | |
| 7,681,902 B2 | 3/2010 | Suzuki | | |
| 8,291,841 B2 | 10/2012 | Correia de Castro | | |
| 8,616,514 B1 | 12/2013 | Baxter | | |

(Continued)

*Primary Examiner* — Joseph M Rocca
*Assistant Examiner* — Michael R Stabley
(74) *Attorney, Agent, or Firm* — Randal Homburg

(57) ABSTRACT

A retractable powered bipod motorcycle stand, attaching below a frame of a motorcycle, retracts and extends below the motorcycle to maintain the motorcycle in a upright position, the motorcycle stand being remotely controlled under power to retract and extend from a travel position to a parked position and back, the retractable motorcycle stand providing an upper mounting frame assembly attached below the motorcycle frame, a bipod lower leg assembly rotating between an elevated position and an extended position, a shaft providing a pivotal relationship between the upper mounting frame assembly and the lower leg assembly, a pusher assembly driving a drive gear attached to the shaft to provide forced rotation of the lower leg assembly, the pusher assembly attaching to a remote activated actuator to provide linear movement to the pusher assembly to drive the pusher assembly in a forward and reverse position to raise and lower the lower leg assembly under intentional force by a remote activation means.

6 Claims, 7 Drawing Sheets

(56) References Cited

U.S. PATENT DOCUMENTS

| | | |
|---|---|---|
| 9,180,922 B2 | 11/2015 | Glover |
| 9,434,433 B1 | 9/2016 | Cheng |
| 9,745,008 B2 * | 8/2017 | Ben-Yair .................. B62H 1/02 180/219 |
| 2010/0013186 A1 * | 1/2010 | Markie .................... B62H 1/06 280/297 |

* cited by examiner

RETRACTABLE BIPOD MOTORCYCLE STAND

CROSS REFERENCE TO RELATED APPLICATIONS

None.

I. BACKGROUND OF THE INVENTION

1. Field of Invention

A retractable powered bipod motorcycle stand, attaching below a frame of a motorcycle, retracts and extends below the motorcycle to maintain the motorcycle in a upright position, the motorcycle stand being remotely controlled under power to retract and extend from a travel position to a parked position and back, the retractable motorcycle stand providing an upper mounting frame assembly attached below the motorcycle frame, a bipod lower leg assembly rotating between an elevated position and an extended position, a shaft providing a pivotal relationship between the upper mounting frame assembly and the lower leg assembly, a pusher assembly driving a drive gear attached to the shaft to provide forced rotation of the lower leg assembly, the pusher assembly attaching to a remote activated actuator to provide linear movement to the pusher assembly to drive the pusher assembly in a forward and reverse position to raise and lower the lower leg assembly under intentional force by a remote activation means.

2. Description of Prior Art

A preliminary review of prior art patents was conducted by the applicant which reveal prior art patents in a similar field or having similar use. However, the prior art inventions do not disclose the same or similar elements as the present retractable powered bipod motorcycle stand, nor do they present the material components in a manner contemplated or anticipated in the prior art.

Stationary motorcycle stands are indicated in several prior art patents, intended to stabilize the vertical stability of the stationary motorcycle. These are independent from the motorcycle and are designed to engage the motorcycle frame or the motorcycle axles. This prior art includes U.S. U.S. Pat. No. 7,028,850 to Sargisian, No. 82991841 to Correia de Castro, U.S. Pat. No. 8,616,514 to Baxter, and U.S. Pat. No. 9,180,922 to Glover.

Remotely powered motorcycle stand incorporated into the motorcycle are also presented in prior art. In U.S. Pat. No. 6,679,054 to Doveri, a hydraulic actuator pivots a stand from a standing position to a resting position. This device focuses on the actuator, which could be used in the present device, but is not essential to the subject matter of the present bipod stand, which instead focuses on the retractable stand and its distinct components. A two-legged balancing stand defines two wheeled legs that expand and retract by an upper housing to raise or lower the two legs independently to present the stationary motorcycle into a vertical position, the device using a hydraulic pump to inject fluid into each hydraulic cylinder comprising each leg of the stand. Again, a hydraulic cylinder can be incorporated into the present stand, but in a distinctly different stand application and component structure and operation as the present stand. In U.S. patent, an actuator acting as a strut is used to raise and lower a side stand, which is only lowered when the motorcycle is placed in a neutral gear. See also, U.S. Pat. No. 7,681,902 to Suzuki. A worn-driven actuator raises and lowers a single leg stand in U.S. Pat. No. 7,584,979 to LaBonte, using an assembly comprising a stationary upper assembly mounted to a motorcycle and a moving lower assembly for ground contact. The stationary assembly includes a horizontal driven shaft coupled to an electric motor (coupled). Using gear reduction, torque is transferred from the horizontal shaft to a vertical screw shaft that extends to a ground contact position and retracts into a protective housing. The vertical screw shaft is pinned so that it does not rotate and is restricted to linear movement. Its component composition and function are distinguished from the present motorcycle retractable bipod stand.

II. SUMMARY OF THE INVENTION

Motorcycle stands are included in motorcycles to retain the motorcycle in a relative vertical position when they are parked. Without them, the motorcycle would be laid upon its side. When there is no rider. Most motorcycles come with a kickstand that is raised and lowered by the rider, placed downward in a vertical position below the motorcycle frame when the rider chooses to park the motorcycle and raised by the motorcycle prior to placing the motorcycle in motion manually. The motorcycle also may use an auxiliary motorcycle support to maintain a vertical orientation for repairs, as seen in the stationary stand not attached to the motorcycle in the prior art. These are commonly referenced by those skilled in the art as a jack stand.

Several motorcycle stands seen in the prior art use various components and means to raise and lower an on-board stand system to retain the motorcycle in a vertical position while parked, also seen in the prior art. However, they do not demonstrate the motorcycle stand having a lower base plate assembly mounting to the lower frame of a motorcycle that employ a remote controlled actuator which provides horizontal movement to a push plate assembly having a lower surface providing a plurality of horizontally aligned gear teeth extensions, a leg assembly pivotally attaching to the base plate assembly by a square profiled pivot shaft, the pivot shaft providing a cylindrical gear extension on a lateral end engaging the horizontal gear teeth extensions of the push plate assembly, the gear teeth and the cylindrical gear extension acting to compel the leg assembly from a raised to a lowered position and reversed, with the push plate sliding horizontally as compelled by the actuator rotating the leg assembly. The leg assembly provides a bipod ground support which places the motorcycle in a vertical stabilized stationary position.

III. DESCRIPTION OF THE DRAWINGS

The following drawings are submitted with this utility patent application.

FIG. 1 is a front perspective view of the retractable motorcycle stand in an extended position.

FIG. 2 1 is a front perspective view of the retractable motorcycle stand in an elevated position.

IV. DESCRIPTION OF THE PREFERRED EMBODIMENT

Figure 1:
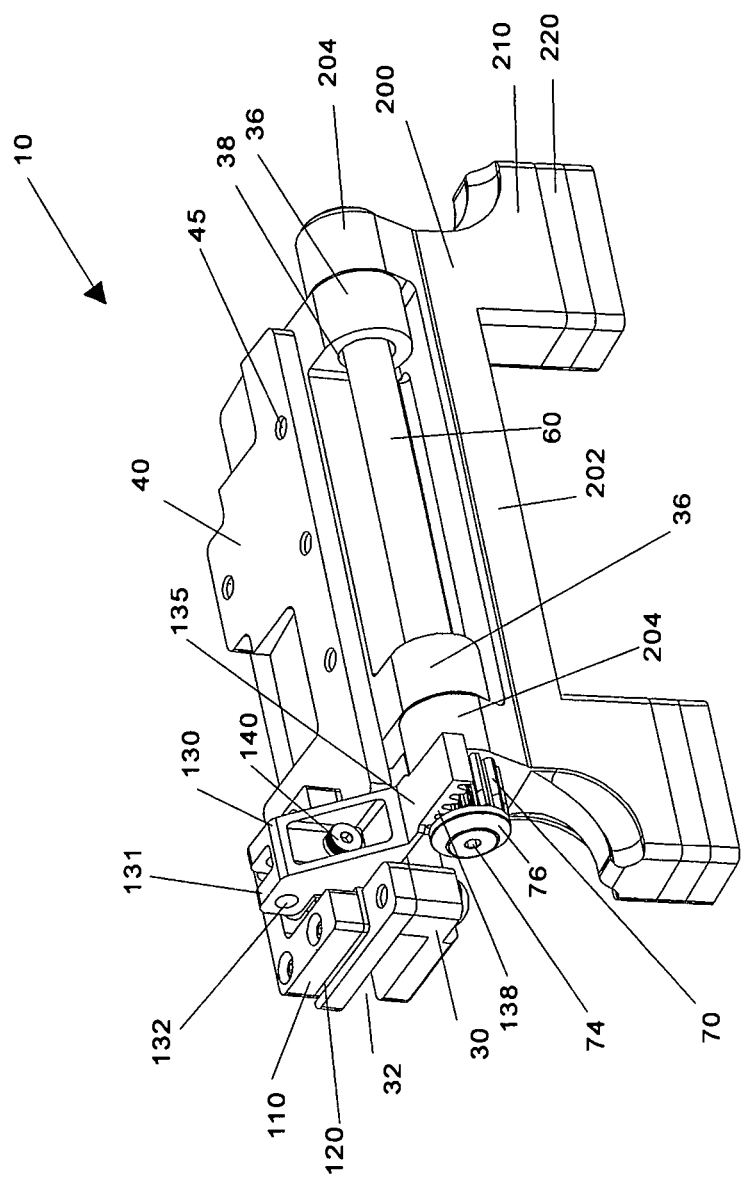

A retractable motorcycle stand 10, applied to a cross-member B of a motorcycle frame A, is shown in FIGS. 1-7 of the drawing figures. The purpose of the present retractable motorcycle stand 10 is to provide a remotely activated stable laterally-oriented bipod stand to support the motorcycle when parked in a vertical position. The retractable motorcycle stand 10 comprises four interacting components which are remotely activated using an actuator C which extends between a stationary end D and an actuator extension E providing a horizontal linear motion to extend and retract the retractable motorcycle stand 10 from an elevated position to an extended position with movement between those two positions at approximately 90 degrees.

Figure 2:
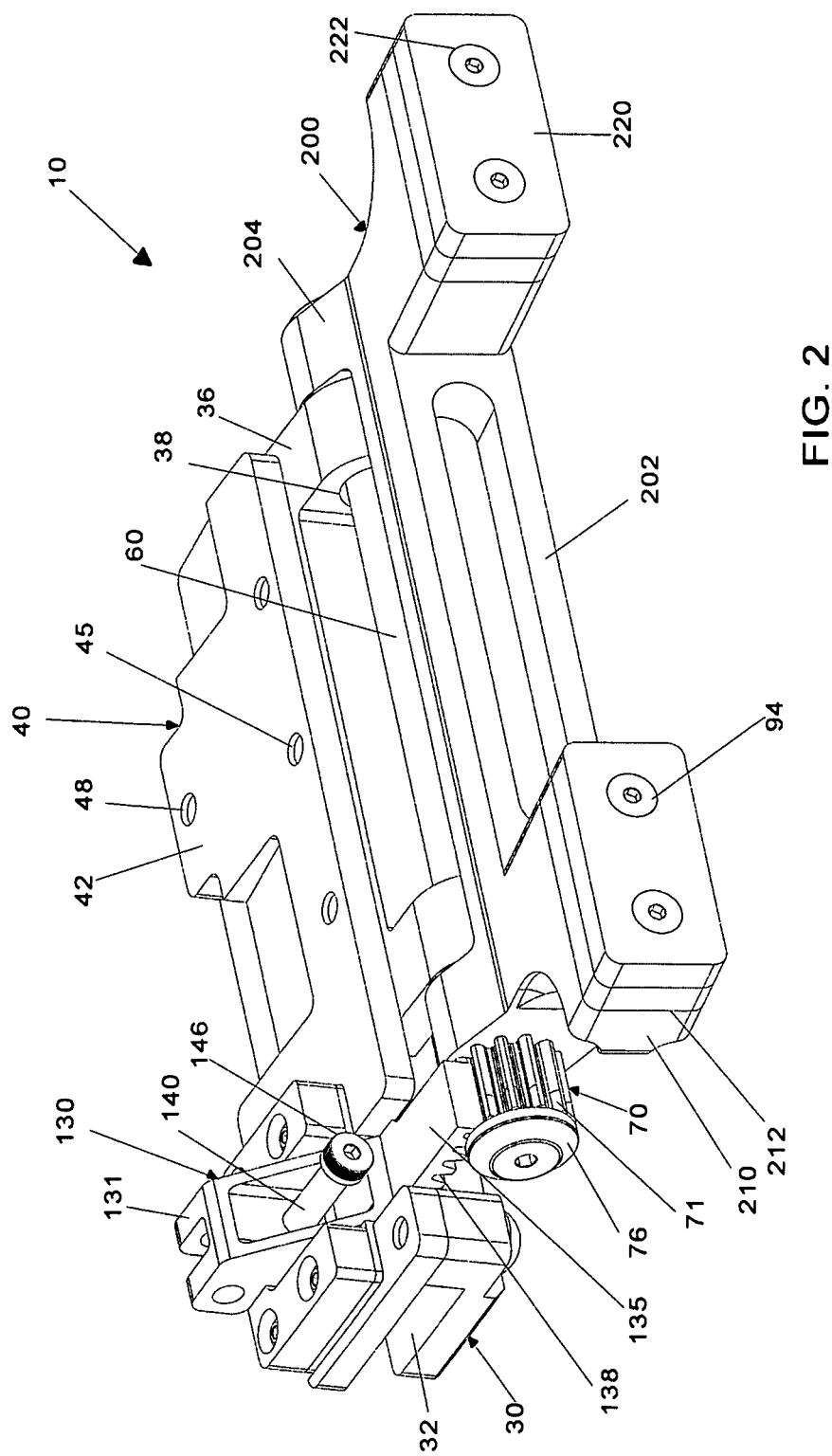

The four basic components of the retractable motorcycle stand 10 include an upper mounting frame assembly 20, FIGS. 1-3, and securing to the cross-member B of the motorcycle frame A below the motorcycle, FIG. 6, a lower leg assembly 200, FIG. 4, pivotally attaching to the upper mounting frame assembly 10 by a cylindrical axle shaft 60, FIG. 7, defining a non-rounded first end 62 secured to a drive gear 70 extending a plurality of radial drive gear teeth 71, the drive gear 70 rotating on a vertical axis while secured to the axle shaft 60, the axle shaft 60 further securing to the lower leg assembly 200 in an attached manner so that the lower leg assembly 200 rotates with the axle shaft 60 while the axle shaft 60 rotates freely within the upper mounting frame assembly 20, and a pusher assembly 100, sliding forward and backward in a horizontal line within the upper mounting frame assembly 20, the pusher member 100, FIG. 5, defining a pusher drive plate 135 having a lower surface 136 defining a plurality of uniform depending pusher drive teeth 138 engaging the radial gear teeth 71 of the drive gear 70, wherein the linear extension of the pusher member assembly 100 forces rotation of the drive gear 70, in turn rotating the lower leg assembly 200 from the elevated position to the extended position and linear withdrawal of the pusher member assembly 100 rotates the lower leg assembly 200 from the extended position to the elevated position, the linear movement of the pusher member assembly 100 compelled by the activation of the actuator C. The motorcycle frame B and the actuator C are not included within the claimed subject matter of the retractable motorcycle stand 10 deferring to those subject matter to the prior art, but including them in the disclosure of the movements and interactions of the present retractable motorcycle stand 10.

Figure 3:
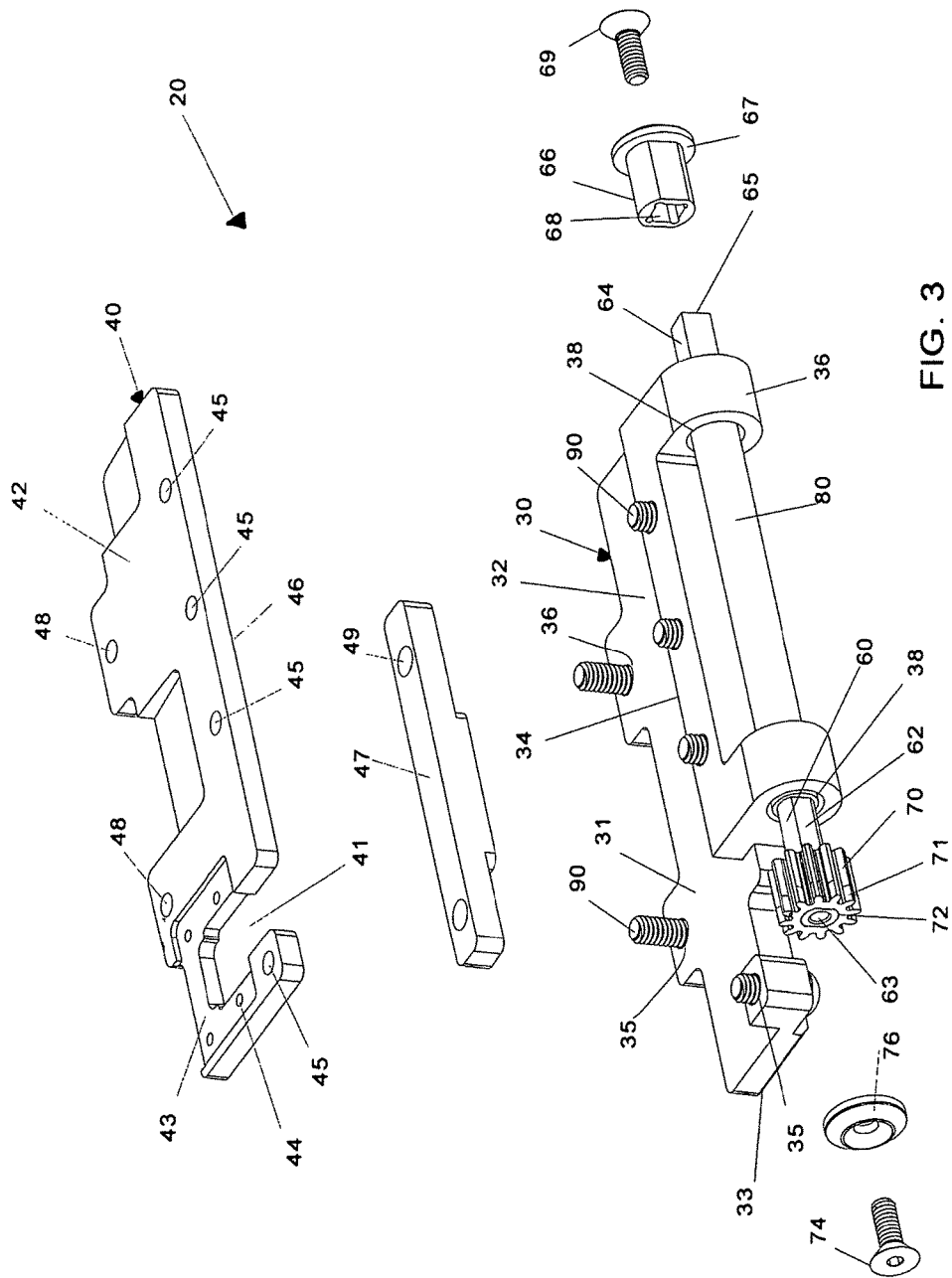
FIG. 3 is an exploded view of the upper mounting frame assembly.

Upper mounting frame assembly 20, in a preferred embodiment shown in FIG. 3, provides a base plate 30 defining an upper surface 31 providing a lateral frame clamp channel 32 and a rear frame channel ridge 34, a lower surface 33, and extends a pair of rear axle brackets 36 defining aligned rounded transverse axle bores 38. The base plate 30 further defines a plurality of base plate bores 35. A top plate 40 defining a plurality of threaded rear top plate bores 45 and at least two threaded spacer bores 48 is secured above the base plate 30 by a plurality of threaded clamp bolts 90 which insert through each base plate bore 35 and engages each respective aligned threaded top plate bore 45 or threaded spacer bore 48. The top plate 40 further defines an upper surface 42 and a lower surface 46. A front spacer 47 defining a pair of smooth spacer bores 49 is placed between the top plate 40 and the base plate 30, with a clamp bolt 90 inserted through each respective base plate bore 35, through the front spacer and engaging each respective front spacer bore 48. The connection of the top plate 40, front spacer 47 and the base plate 30 securely capture and secure to the cross member B of the motorcycle frame A, with the cross-member B located within the lateral frame clamp channel 32, against the rear frame channel ridge 34, the and against the front spacer 47, with the components constructed in such manner as dimensionally adapting to the cross-member B of the motorcycle frame A or the motorcycle cross member B adapting to the provided components of the upper mounting frame assembly 20. The upper surface 42 of the top plate 40 further defines a pusher channel 41 with a pusher assembly recess 43, the pusher assembly recess 43 defining a plurality of pusher assembly bores 44. The upper mounting frame assembly 20 is stationary and immovable once secured to the cross member B of the motorcycle frame A during operation and use.

Figure 4:
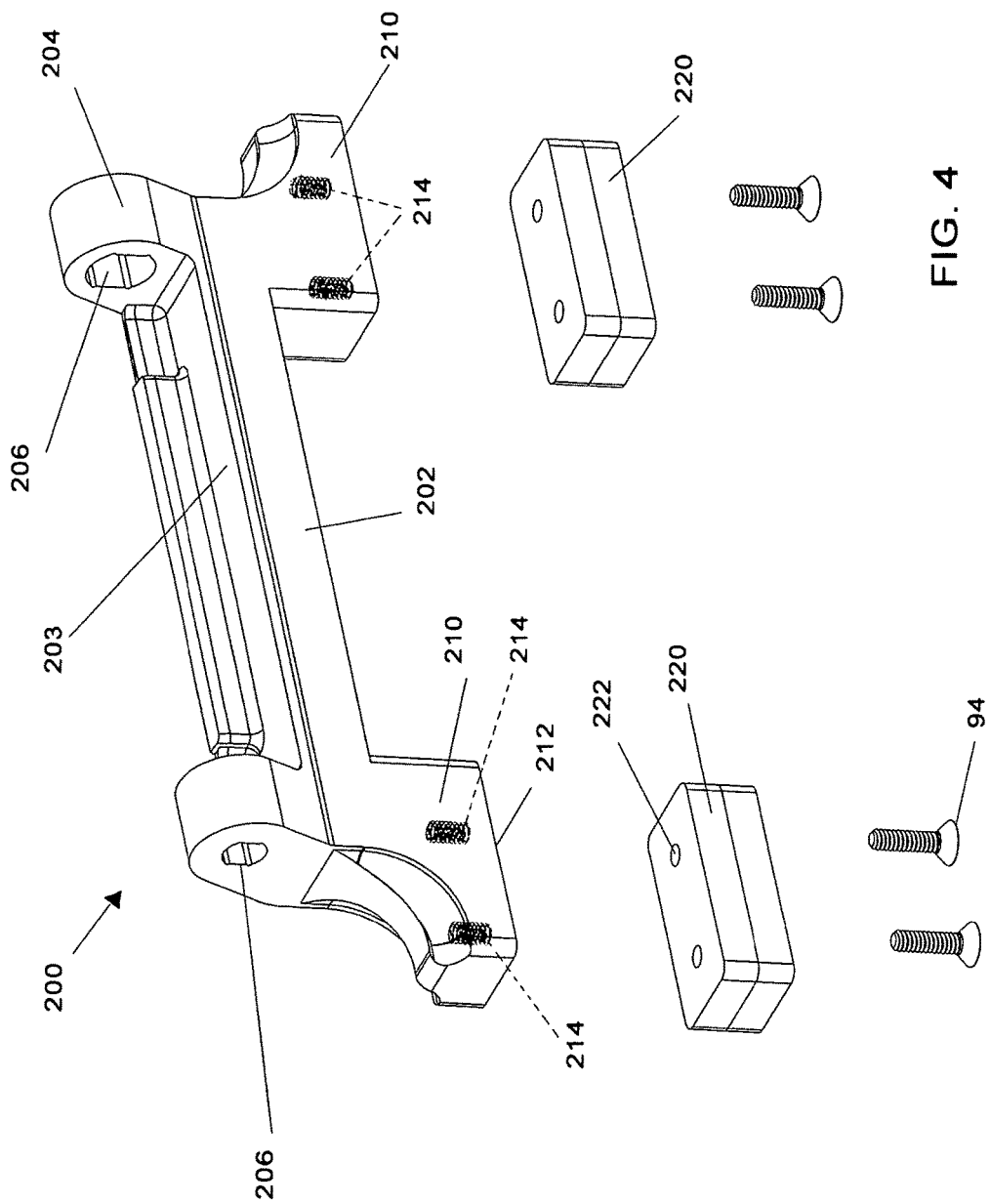
FIG. 4 is an exploded view of the lower leg assembly.

The lower leg assembly 200, as shown in the preferred embodiment of FIG. 4, further comprises a frame support member 202 extending a pair of lateral upper axle brackets 204 providing non-rounded axle bores 206, an upper stop ridge 203, the frame support member 202 depending a pair of lateral lower leg extensions 210, each lower leg extension 210 providing a lower end 212 with at least two threaded spacer bores 214. Each threaded spacer bore 214 is provided to receive a spacer bolt 94 which attach one or more optional elevation spacers 220 to increase the length of each respective lower leg extension 210 to provide each lower leg extension 210 with an adaptable length depending on the height of the motorcycle frame A, making the retractable motorcycle stand A adaptable to different motorcycles by adding elevation spacers 220 to each respective lower leg extension 210 to properly level the motorcycle while parked.

Figure 7:
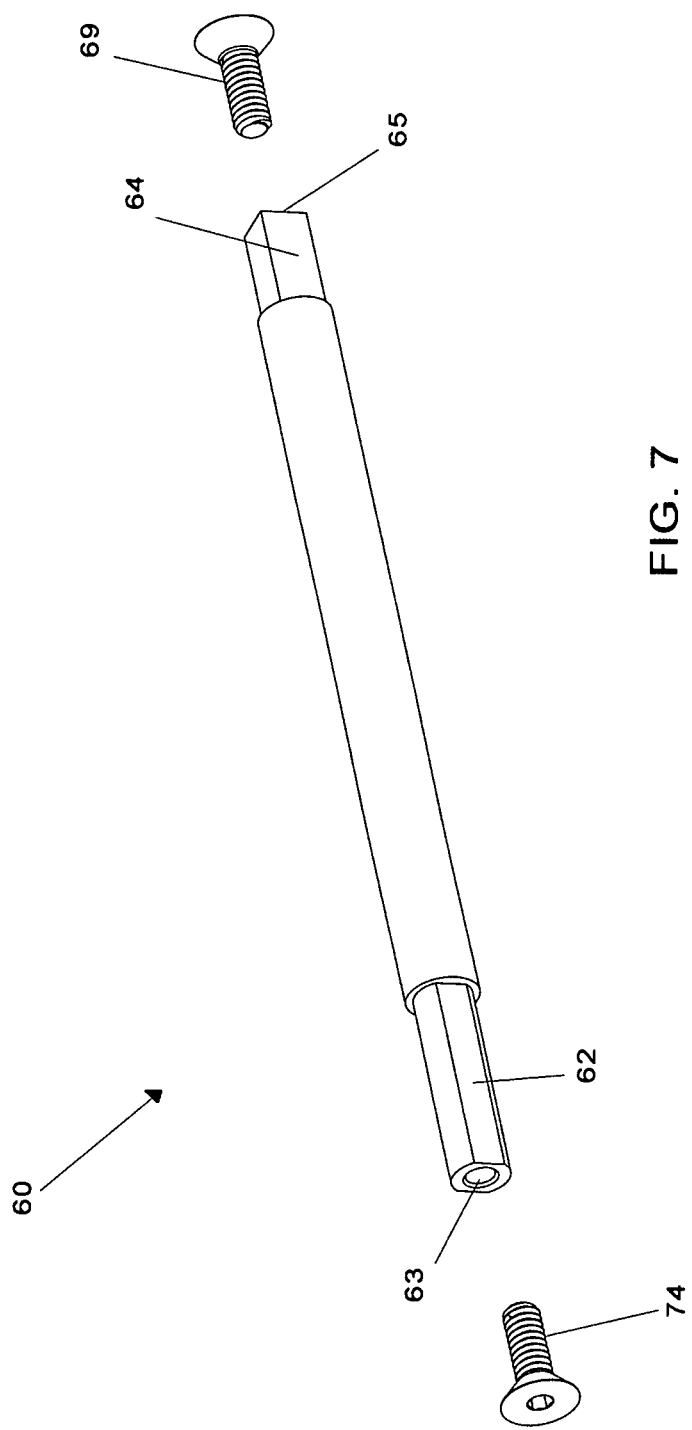
FIG. 7 is a perspective view of the axle shaft.

The cylindrical axle shaft 60, shown in a preferred embodiment of FIG. 7, further comprises the non-rounded first end 62 having an threaded axle bore 63 and a non-rounded second end 64 having a threaded axle bore 65. The non-rounded first end attaches through to the non-rounded gear axle bore 72 defined within the drive gear 70, securing the drive gear 70 to the first end 62, held in place by an axle bolt 69 through an axle washer 76 secured within the threaded axle bore 63 of the first end 62. The non-rounded first end 62 also engages one of the non-rounded axle bores 206 of the upper axle bracket 204 of the lower leg assembly 200. The non-rounded second end 64 attaches to a non-rounded axle end recess 68 within an axle sleeve cap 66 further defining a cap expansion 67, the axle sleeve cap 66 held onto the second end 64 by an axle bolt 69 through the axle sleeve cap 66 secured within the threaded axle bore 65 of the second end 64. The non-rounded second end 64 also engages the other non-rounded axle bore 206 of the upper axle bracket 204 of the lower leg assembly 200. The cylindrical axle shaft 60, as previously defined, rotates freely within the rounded axle bore 38 of the rear axle brackets 36, which lie in between the upper axle brackets 204 of the lower leg extension 200 when engaging the axle shaft 60. This provides the cylindrical axle shaft 60 freely rotating within both rear axle brackets 36, while secured by inclusion of the non-rounded first end 62 to the drive gear 70 and one non-rounded axle bore 206 of the upper axle bracket 204 and the non-rounded second end 64 to the non-rounded axle end recess 68 of the axle sleeve cap 66 and the other non-rounded axle bore 206 of other upper axle bracket 204.

Figure 5:
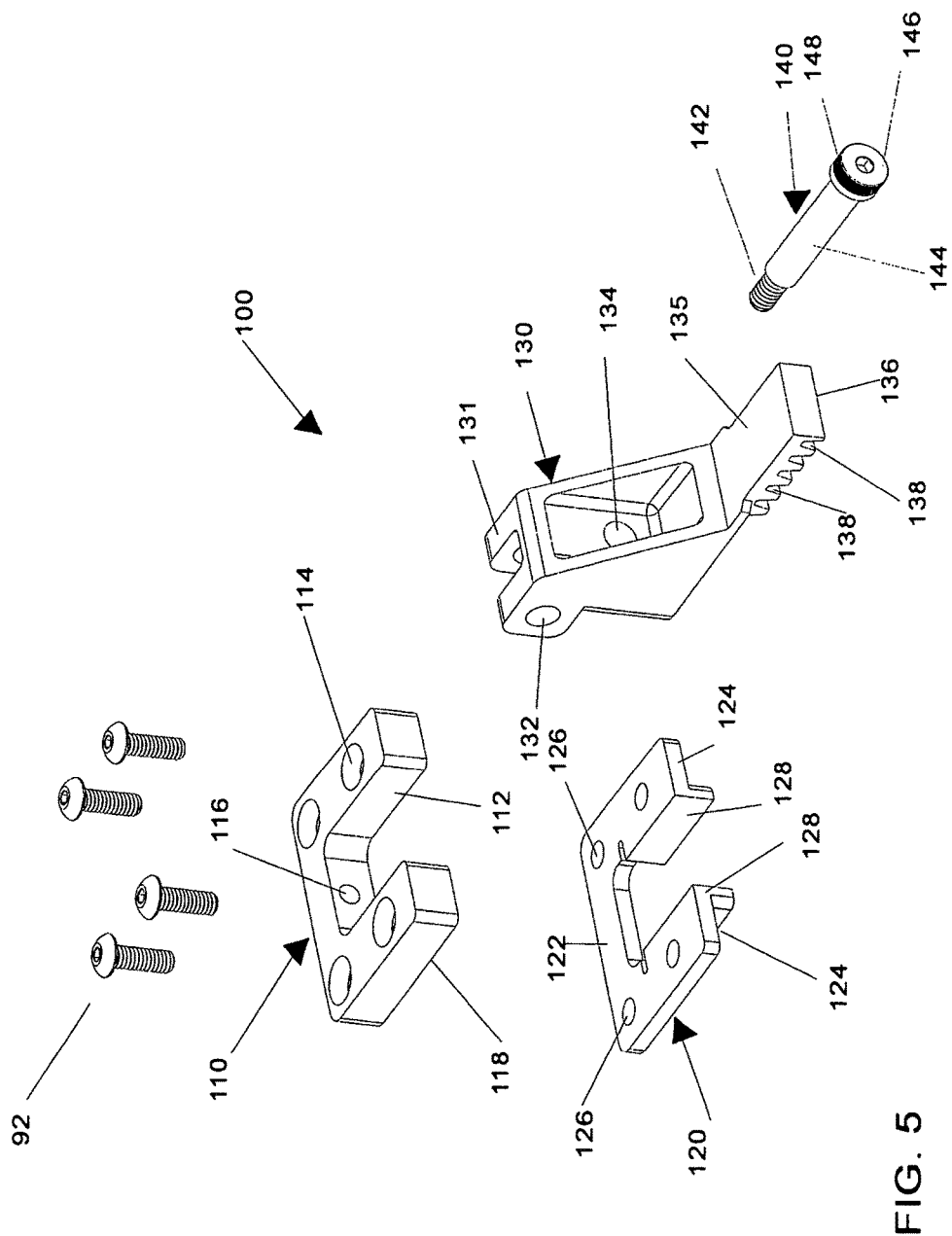
FIG. 5 is an exploded view of the pusher assembly.

The pusher assembly 100, shown in a preferred embodiment of FIG. 5, further defines a U-shaped pusher support collar 110, a pusher alignment shim 120 and a pusher member 130. The U-shaped pusher support collar 110 defines a slide channel keeper 112 with a plurality of collar bores 114, an inner threaded rear front limiter bore 116 and a lower surface 118. The pusher alignment shim 120 further defines an upper surface 122, a lower surface 124, a plurality of shim bores 126 matching the orientation of the plurality of collar bores 114 of the U-shaped pusher support collar 110, and a pair of depending lateral guide extensions 128. The upper surface 122 of the pusher alignment shim 120 is placed against the lower surface 118 of the U-shaped pusher support collar 110 with the lower surface 124 of the pusher alignment shim 120 located within the pusher assembly recess 43 of the top plate 40. Pusher collar bolts 92 are secured through the aligned collar bores 114 of the U-shaped support collar 110, the shim bores 126 of the pusher alignment shim 120 and within the threaded pusher assembly bores 44 of the top plate 40 to secure the U-shaped support collar 110 and pusher alignment shim 120 within the pusher assembly recess 43, with the lateral guide extensions 128 extending below the slide channel keeper 112.

The pusher member 130 further comprises a pair of actuator bracket extensions 131 having aligned transverse actuator bores 132, a horizontal limiter slide bore 134, and the rear extending pusher drive plate 135 defining the lower surface 136 providing the plurality of pusher drive teeth 138. The pusher member 130 is contained within the slide channel keeper 112, limiting the movement of the pusher member 130 to a forward to rear sliding horizontal linear movement. The pusher member 130 is further restricted in distance of forward to rear sliding horizontal linear movement by a limiter 140. The limiter 140 is further defined by a threaded end 142 which inserts through the limiter slide bore 134 and secures within the front limiter bore 116 of the U-shaped pusher support collar 110, the limiter 140 further extending a smooth limiter shaft 144 within which the limiter slide bore 134 of the pusher member 130 slides, with a limiter stop 148 terminating into a limiter expansion head 146 which provides a rear sliding limitation to the pusher member 130.

Figure 6:
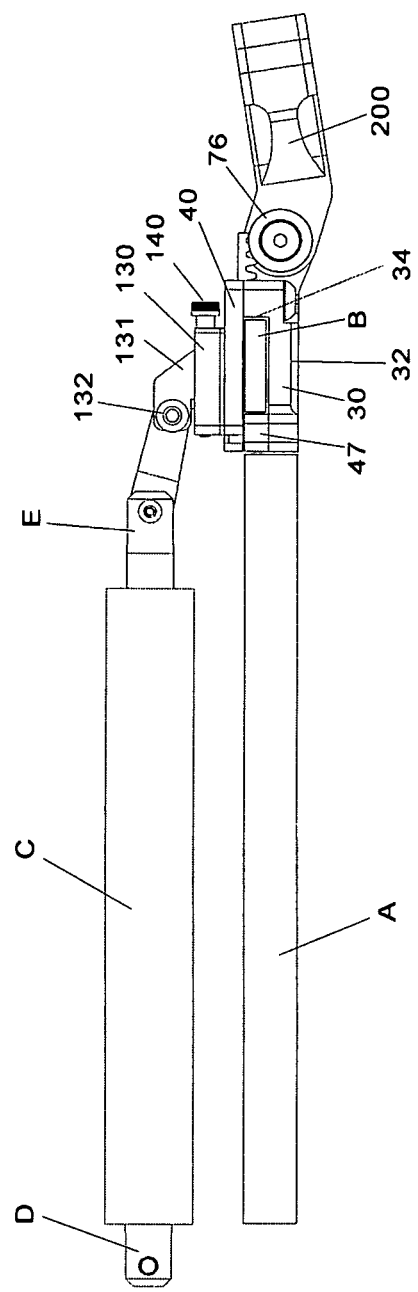
FIG. 6 is a side view of the retractable motorcycle stand in an elevated position attached to a cross member of a motorcycle frame with an actuator attached to the pusher assembly as properly installed on the motorcycle frame.

When assembled, the pusher member 130 is compelled to slide forward and backward within the upper mounting frame assembly 20 by the actuator C, FIG. 6, the actuator extension E of the actuator C secured within the actuator bracket extension 131 of the pusher member 130 while the stationary end D of the actuator C is secured to another location, either within the retractable motorcycle stand 10 or the motorcycle frame A. The actuator C would be extended and contracted by a remote activator means, not shown. When the actuator C is retracted, the lower leg assembly 200 pivots into the elevated position (horizontal) and when the actuator C is extended, the lower leg assembly 200 is deployed into the extended position (vertical). This is caused by the rear driven interaction of the pusher drive teeth 138 of the pusher drive plate 135 engaging the radial gear teeth 71 of the drive gear 70, forcing rotation of the drive gear 70 and the axle shaft 60 which in turn forces rotation of the lower leg assembly 200 downward. The forward withdrawal of the pusher drive teeth 138 reverses the direction of the drive gear 70, forcing an opposite rotation of the drive gear 70 and the axle shaft 60 which in turn forces rotation of the lower leg assembly 200 upward. The limiter 140 is included to limit the range of motion of the pusher member 130 to a predetermined and measured rotation of the lower leg assembly 200 to prevent over rotation of the lower leg assembly 200 between the elevated position and the extended position.

To prevent secondary over-rotation of the lower leg assembly 200, there is a stop limitation provided by an interaction between the upper stop ridge 203 of the lower leg assembly 200, which limits the rotation of the lower leg assembly 200 to a lower 90 degree angle by contact with the lower surface 33 of the base plate 30. The lower leg assembly 200 also cannot extend beyond an upper 90 degree angle due to the limitation restriction between the frame support member 202 of the lower leg assembly 200 and the upper mounting frame assembly 20, but the upper 90 degree angle is an angle not contemplated within the operational movement of the retractable motorcycle stand 10.

Installation of the retractable motorcycle stand 10 consisting first by attaching the upper mounting frame assembly 20 to a selected cross frame support member B below the motorcycle frame A at a desired location, FIG. 6. Next, the actuator C is attached to the actuator bracket extension 131 and the pusher drive plate 135 and the drive gear 70 are set in relative position to place the lower leg assembly 200 in the extended position when the actuator C is extended and in the elevated position when the actuator C is withdrawn, placing the lower leg assembly 200 in line with the upper mounting frame assembly 20 in the elevated position and the lower leg assembly 200 at a 90 degree lower angle with the upper mounting frame assembly 20 in the extended position. Once again, the operation of the actuator C is preferably by a remote means. There may be some type of override system built into the remote means to prevent movement of the retractable motorcycle assembly during engagement of the transmission in an operating mode.

The objective benefits of the retractable motorcycle assembly 10 is provided in the lower leg assembly 200 providing greater stability of the present motorcycle stand 10 over prior art motorcycle stand that have a singular contact with the ground. Another benefit is provided in the level orientation provided by the present motorcycle stand 10 when in the extended position, placing the motorcycle in a near, if not exacting vertical position. A third benefit is provided in the interaction of the pusher member 130 and the pusher drive plate 135 with the linear pusher drive teeth 138 being extended along a horizontal linear pathway urging rotation of the radial gear teeth 71 of the drive gear 70 attached to the lower leg assembly 200 by the present axle shaft 60 rotating the lower leg assembly 200 under intentional user directed force between the elevated and extended positions, preventing accidental or incidental movement of the retractable motorcycle stand 10 unless intended by the motorcycle operator. Other benefits of the present retractable motorcycle stand 10 will be observed by those skilled in the art of motorcycle stand over the prior art. Thus, while the retractable motorcycle stand 10 has been particularly shown and described with reference to a preferred embodiment thereof, it will be understood by those skilled in the art that changes in form and detail may be made therein without departing from the spirit and scope of the invention.

What is claimed is:

1. A retractable motorcycle stand applied to a cross-member of a motorcycle frame and remotely activated using an actuator providing a horizontal linear movement to said retractable motorcycle stand between an elevated position and an extended position, said retractable motorcycle stand comprising:
   an upper mounting frame assembly securing to said cross-member below said motorcycle frame;
   a lower leg assembly defining a pair of lateral lower leg extensions;

a cylindrical axle shaft pivotally attaching said lower leg assembly to said upper mounting frame assembly, said cylindrical axle shaft further defining a non-rounded first end secured to a drive gear extending a plurality of radial drive gear teeth, said drive gear rotating on a horizontal axis as secured to said axle shaft, said axle shaft and said lower leg assembly engaging in an attached manner, wherein said lower leg assembly rotates with said axle shaft while said axle shaft rotates freely within said upper mounting frame assembly; and a pusher member assembly slidably engaging said upper mounting frame assembly in a horizontal linear movement, said pusher member assembly further defining a pusher drive plate having a lower surface defining a plurality of uniform depending pusher drive teeth engaging said radial gear teeth of said drive gear, wherein linear extension of said pusher member assembly forces rotation of said drive gear, in turn rotating said lower leg assembly from said elevated position to said extended position and linear withdrawal of said pusher member assembly rotates said lower leg assembly from said extended position to said elevated position, said linear movement of said pusher member assembly compelled by said activation of said actuator by intent of a motorcycle operator.

2. The retractable motorcycle stand of claim 1, said upper mounting frame assembly further comprising:
   a base plate with an upper surface defining a lateral frame clamp channel and a rear frame channel ridge, a lower surface, a pair of rear axle brackets defining a pair of aligned rounded transverse axle bores, and a plurality of base plate bores;
   a top plate defining a plurality of threaded rear top plate bores and at least two threaded spacer bores, said top plate secured upon said base plate by a plurality of threaded clamp bolts attaching through each respective base plate bore into each respective aligned threaded top plate bore or threaded spacer bore, said top plate further defining an upper surface and a lower surface;
   a front spacer defining a pair of smooth spacer bores installed between said top plate and said base plate, a clamp bolt inserting through each respective base plate bore, through said front spacer, engaging each respective said front spacer bore, wherein connection of said top plate, front spacer and said base plate capture and secure said cross member of said motorcycle frame, with said cross-member located within said lateral frame clamp channel, against the rear frame channel ridge, and against said front spacer; wherein said upper mounting frame assembly is stationary and immovable once secured to said cross member of said motorcycle frame during operation and use of said retractable motorcycle stand.

3. The retractable motorcycle stand of claim 1, said lower leg assembly further comprising:
   a frame support member extending a pair of lateral upper axle brackets providing non-rounded axle bores, an upper stop ridge, a frame support member depending said pair of lateral lower leg extensions, each said lower leg extension defining a lower end with at least two threaded spacer bores, each said threaded spacer bore receiving a spacer bolt to attach one or more optional elevation spacers to increase the length of each respective said lower leg extension providing each said lower leg extension, wherein said retractable motorcycle stand is adaptable to different motorcycle frames by addition of said optional elevation spacers to each respective lower leg extension required to level said motorcycle frame when parked.

4. The retractable motorcycle stand of claim 1, further comprising:
   a base plate with an upper surface defining a lateral frame clamp channel and a rear frame channel ridge, a lower surface, a pair of rear axle brackets defining a pair of aligned rounded transverse axle bores, and a plurality of base plate bores;
   a top plate defining a plurality of threaded rear top plate bores and at least two threaded spacer bores, said top plate secured upon said base plate by a plurality of threaded clamp bolts attaching through each respective base plate bore into each respective aligned threaded top plate bore or threaded spacer bore, said top plate further defining a lower surface and an upper surface defining a pusher channel with a pusher assembly recess, said pusher assembly recess defining a plurality of pusher assembly bores; and
   said pusher member assembly including a U-shaped pusher support collar, a pusher alignment shim and a pusher member, said U-shaped pusher support collar defining a slide channel keeper with a plurality of collar bores, an inner threaded rear front limiter bore and a lower surface, said pusher alignment shim further defining an upper surface, a lower surface, a plurality of shim bores matching the orientation and alignment of said plurality of collar bores of said U-shaped pusher support collar, and a pair of depending lateral guide extensions, wherein said upper surface of said pusher alignment shim is placed against said lower surface of said U-shaped pusher support collar with said lower surface of said pusher alignment shim located within said pusher assembly recess of said top plate while respective pusher collar bolts are secured through said aligned collar bores of said U-shaped support collar, said shim bores of said pusher alignment shim and within said threaded pusher assembly bores of said top plate to secure said U-shaped support collar and said pusher alignment shim within said pusher assembly recess with said lateral guide extensions extending below said slide channel keeper.

5. The retractable motorcycle stand of claim 1, further comprising:
   a base plate with an upper surface defining a lateral frame clamp channel and a rear frame channel ridge, a lower surface, a pair of rear axle brackets defining a pair of aligned rounded transverse axle bores, and a plurality of base plate bores;
   a top plate defining a plurality of threaded rear top plate bores and at least two threaded spacer bores, said top plate secured upon said base plate by a plurality of threaded clamp bolts attaching through each respective base plate bore into each respective aligned threaded top plate bore or threaded spacer bore, said top plate further defining a lower surface and an upper surface defining a pusher channel with a pusher assembly recess, said pusher assembly recess defining a plurality of pusher assembly bores;
   a U-shaped pusher support collar, a pusher alignment shim and a pusher member, said U-shaped pusher support collar defining a slide channel keeper with a plurality of collar bores, an inner threaded rear front limiter bore and a lower surface, said pusher alignment shim further defining an upper surface, a lower surface, a plurality of shim bores matching the orientation and alignment of said plurality of collar bores of said U-shaped pusher support collar, and a pair of depending lateral guide extensions, wherein said upper surface of said pusher alignment shim is placed against said lower surface of said U-shaped pusher support collar with said lower surface of said pusher alignment shim located within said pusher assembly recess of said top plate while respective pusher collar bolts are secured through said aligned collar bores of said U-shaped support collar, said shim bores of said pusher alignment shim and within said threaded pusher assembly bores of said top plate to secure said U-shaped support collar and said pusher alignment shim within said pusher assembly recess with said lateral guide extensions extending below said slide channel keeper; and said pusher member defining a pair of actuator bracket extensions having aligned transverse actuator bores, a horizontal limiter slide bore, and the rear extending pusher drive plate defining said lower surface depending said plurality of pusher drive teeth, said pusher member is contained within said slide channel keeper restricting movement of said pusher member to said horizontal linear movement forward and reverse said pusher member further restricted in distance of forward to rear horizontal linear movement by a limiter, said limiter defining a threaded end inserting through said limiter slide bore and securing within said front limiter bore of said U-shaped pusher support collar, said limiter extending a smooth limiter shaft within which said limiter slide bore of said pusher member slides, and a limiter stop terminating into a limiter expansion head providing a sliding limitation to said pusher member, further determining an optimal ninety degree limitation between said extended position and said elevated position of said lower leg assembly within said retractable motorcycle stand.

6. The retractable motorcycle stand of claim 1, said cylindrical axle shaft further comprising:
said non-rounded first end having a threaded axle bore, said non-rounded first end attaching to a non-rounded gear axle bore defined within said drive gear, securing said drive gear to said first end and held in place by an axle bolt through an axle washer into said threaded axle bore of said first end, said non-rounded first end further engaging one of a pair of non-rounded axle bores of an upper axle bracket extending from said lower leg assembly; and
said non-rounded second end defining a threaded axle bore attaching to a non-rounded axle end recess within an axle sleeve cap, said axle cap further defining a cap expansion, said axle sleeve cap securing to said second end by an axle bolt through said axle sleeve cap secured within said threaded axle bore of said second end, said non-rounded second end further engaging another one of said pair of non-rounded axle bores of an upper axle bracket extending from said lower leg assembly, said cylindrical axle shaft rotating freely within rounded axle bores of a pair of rear axle brackets extending from said upper mounting frame assembly, wherein said cylindrical axle shaft freely rotates within said rear axle brackets of said upper mounting frame assembly, while secured to said non-rounded first end to said drive gear and said non-rounded axle bore of said upper axle bracket of said lower leg assembly and said non-rounded second end is attached through said non-rounded axle bore of the other said upper axle bracket of lower leg assembly.

\* \* \* \* \*